US007609422B2

United States Patent
Kagami (10) Patent No.: US 7,609,422 B2
(45) Date of Patent: Oct. 27, 2009

(54) DOCUMENT READING APPARATUS THAT READS A DOCUMENT IMAGE WITH A CCD IMAGE SENSOR

(75) Inventor: Yoshinobu Kagami, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 975 days.

(21) Appl. No.: 10/939,460

(22) Filed: Sep. 14, 2004

(65) Prior Publication Data

US 2005/0105143 A1    May 19, 2005

(30) Foreign Application Priority Data

Sep. 18, 2003    (JP) ............... 2003-326920

(51) Int. Cl.
    *H04N 1/04*    (2006.01)
(52) U.S. Cl. ....................... 358/483; 358/474
(58) Field of Classification Search ........ 358/400, 358/443, 448, 482, 494, 470, 473, 483, 474, 358/497, 461; 348/139, 135, 61; 345/606, 345/581, 418

See application file for complete search history.

(56) References Cited

U.S. PATENT DOCUMENTS

| | | | |
|---|---|---|---|
| 5,027,117 A | 6/1991 | Yoshida et al. | |
| 5,382,129 A | 1/1995 | Shimizu et al. | |
| 6,512,523 B1 * | 1/2003 | Gross | 345/606 |
| 6,606,172 B1 * | 8/2003 | Moro | 358/483 |
| 6,683,703 B1 * | 1/2004 | Iwai | 358/461 |
| 2001/0030769 A1 | 10/2001 | Jacobs | |
| 2001/0030770 A1 | 10/2001 | Ohashi | |
| 2002/0126205 A1 * | 9/2002 | Saito et al. | 348/139 |
| 2004/0212847 A1 * | 10/2004 | Bliley et al. | 358/474 |
| 2006/0017819 A1 | 1/2006 | Ohashi | |

FOREIGN PATENT DOCUMENTS

| | | |
|---|---|---|
| EP | 0 376 265 A1 | 7/1990 |
| EP | 0 473 966 A1 | 3/1992 |
| JP | 6-14188 | 1/1994 |
| JP | 9-74479 | 3/1997 |
| JP | 2001-211297 | 8/2001 |
| JP | 2001-346012 | 12/2001 |

* cited by examiner

*Primary Examiner*—Mark K. Zimmerman
*Assistant Examiner*—Ming Hon
(74) *Attorney, Agent, or Firm*—Oblon, Spivak, McClelland, Maier & Neustadt, L.L.P.

(57) ABSTRACT

A document reading apparatus includes average output value detecting circuits and random value generating adder/subtractor circuits. The average output value detecting circuits detect and hold the average output values of the pixels of the FO, FE, LO, and LE outputs, respectively. The random value generating adder/subtractor circuits each has a function of randomly generating any value between 0 and 1, and performs an arithmetic operation on all the pixels of the LO outputs, using the following equation:

$$D\text{out} = \text{ROUND}(D\text{in} - 0.5 + \text{RAND} + a)$$

where: ROUND represents a round-off function for rounding off a decimal point or below; RAND represents a random number that is renewed for each pixel; and a represents the difference in average value, which is 1.5 in this case.

6 Claims, 6 Drawing Sheets

| IMAGE DATA | F/L DIFFERENCE | IMAGE DATA | F/L DIFFERENCE | IMAGE DATA | F/L DIFFERENCE | IMAGE DATA | F/L DIFFERENCE | IMAGE DATA | F/L DIFFERENCE |
|---|---|---|---|---|---|---|---|---|---|
| 0 | 0 | 57 | 1.16 | 114 | 1.4 | 171 | 1.34 | 228 | 0.71 |
| 1 | 0.03 | 58 | 1.17 | 115 | 1.4 | 172 | 1.34 | 229 | 0.69 |
| 2 | 0.06 | 59 | 1.18 | 116 | 1.4 | 173 | 1.34 | 230 | 0.67 |
| 3 | 0.1 | 60 | 1.19 | 117 | 1.4 | 174 | 1.33 | 231 | 0.65 |
| 4 | 0.13 | 61 | 1.2 | 118 | 1.4 | 175 | 1.33 | 232 | 0.63 |
| 5 | 0.16 | 62 | 1.21 | 119 | 1.4 | 176 | 1.32 | 233 | 0.61 |
| 6 | 0.19 | 63 | 1.22 | 120 | 1.4 | 177 | 1.32 | 234 | 0.58 |
| 7 | 0.22 | 64 | 1.23 | 121 | 1.4 | 178 | 1.31 | 235 | 0.56 |
| 8 | 0.25 | 65 | 1.24 | 122 | 1.4 | 179 | 1.31 | 236 | 0.54 |
| 9 | 0.28 | 66 | 1.24 | 123 | 1.4 | 180 | 1.3 | 237 | 0.51 |
| 10 | 0.3 | 67 | 1.25 | 124 | 1.4 | 181 | 1.3 | 238 | 0.49 |
| 11 | 0.33 | 68 | 1.26 | 125 | 1.4 | 182 | 1.29 | 239 | 0.46 |
| 12 | 0.36 | 69 | 1.26 | 126 | 1.4 | 183 | 1.28 | 240 | 0.44 |
| 13 | 0.39 | 70 | 1.27 | 127 | 1.4 | 184 | 1.28 | 241 | 0.41 |
| 14 | 0.41 | 71 | 1.28 | 128 | 1.4 | 185 | 1.27 | 242 | 0.39 |
| 15 | 0.44 | 72 | 1.28 | 129 | 1.4 | 186 | 1.26 | 243 | 0.36 |
| 16 | 0.46 | 73 | 1.29 | 130 | 1.4 | 187 | 1.26 | 244 | 0.33 |
| 17 | 0.49 | 74 | 1.3 | 131 | 1.4 | 188 | 1.25 | 245 | 0.3 |
| 18 | 0.51 | 75 | 1.3 | 132 | 1.4 | 189 | 1.24 | 246 | 0.28 |
| 19 | 0.54 | 76 | 1.31 | 133 | 1.4 | 190 | 1.24 | 247 | 0.25 |
| 20 | 0.56 | 77 | 1.31 | 134 | 1.4 | 191 | 1.23 | 248 | 0.22 |
| 21 | 0.58 | 78 | 1.32 | 135 | 1.4 | 192 | 1.22 | 249 | 0.19 |
| 22 | 0.61 | 79 | 1.32 | 136 | 1.4 | 193 | 1.21 | 250 | 0.16 |
| 23 | 0.63 | 80 | 1.33 | 137 | 1.4 | 194 | 1.2 | 251 | 0.13 |
| 24 | 0.65 | 81 | 1.33 | 138 | 1.4 | 195 | 1.19 | 252 | 0.1 |
| 25 | 0.67 | 82 | 1.34 | 139 | 1.4 | 196 | 1.18 | 253 | 0.06 |
| 26 | 0.69 | 83 | 1.34 | 140 | 1.4 | 197 | 1.17 | 254 | 0.03 |
| 27 | 0.71 | 84 | 1.34 | 141 | 1.4 | 198 | 1.16 | 255 | 0 |
| 28 | 0.73 | 85 | 1.35 | 142 | 1.4 | 199 | 1.15 | | |
| 29 | 0.75 | 86 | 1.35 | 143 | 1.4 | 200 | 1.14 | | |
| 30 | 0.77 | 87 | 1.36 | 144 | 1.4 | 201 | 1.13 | | |
| 31 | 0.79 | 88 | 1.36 | 145 | 1.4 | 202 | 1.12 | | |
| 32 | 0.81 | 89 | 1.36 | 146 | 1.4 | 203 | 1.11 | | |
| 33 | 0.83 | 90 | 1.36 | 147 | 1.39 | 204 | 1.1 | | |
| 34 | 0.85 | 91 | 1.37 | 148 | 1.39 | 205 | 1.09 | | |
| 35 | 0.87 | 92 | 1.37 | 149 | 1.39 | 206 | 1.07 | | |
| 36 | 0.88 | 93 | 1.37 | 150 | 1.39 | 207 | 1.06 | | |
| 37 | 0.9 | 94 | 1.37 | 151 | 1.39 | 208 | 1.05 | | |
| 38 | 0.92 | 95 | 1.38 | 152 | 1.39 | 209 | 1.03 | | |
| 39 | 0.93 | 96 | 1.38 | 153 | 1.39 | 210 | 1.02 | | |
| 40 | 0.95 | 97 | 1.38 | 154 | 1.39 | 211 | 1.01 | | |
| 41 | 0.96 | 98 | 1.38 | 155 | 1.39 | 212 | 0.99 | | |
| 42 | 0.98 | 99 | 1.38 | 156 | 1.38 | 213 | 0.98 | | |
| 43 | 0.99 | 100 | 1.39 | 157 | 1.38 | 214 | 0.96 | | |
| 44 | 1.01 | 101 | 1.39 | 158 | 1.38 | 215 | 0.95 | | |
| 45 | 1.02 | 102 | 1.39 | 159 | 1.38 | 216 | 0.93 | | |
| 46 | 1.03 | 103 | 1.39 | 160 | 1.38 | 217 | 0.92 | | |
| 47 | 1.05 | 104 | 1.39 | 161 | 1.37 | 218 | 0.9 | | |
| 48 | 1.06 | 105 | 1.39 | 162 | 1.37 | 219 | 0.88 | | |
| 49 | 1.07 | 106 | 1.39 | 163 | 1.37 | 220 | 0.87 | | |
| 50 | 1.09 | 107 | 1.39 | 164 | 1.37 | 221 | 0.85 | | |
| 51 | 1.1 | 108 | 1.39 | 165 | 1.36 | 222 | 0.83 | | |
| 52 | 1.11 | 109 | 1.4 | 166 | 1.36 | 223 | 0.81 | | |
| 53 | 1.12 | 110 | 1.4 | 167 | 1.36 | 224 | 0.79 | | |
| 54 | 1.13 | 111 | 1.4 | 168 | 1.36 | 225 | 0.77 | | |
| 55 | 1.14 | 112 | 1.4 | 169 | 1.35 | 226 | 0.75 | | |
| 56 | 1.15 | 113 | 1.4 | 170 | 1.35 | 227 | 0.73 | | |

DOCUMENT READING APPARATUS THAT READS A DOCUMENT IMAGE WITH A CCD IMAGE SENSOR

BACKGROUND OF THE INVENTION

1. Field of the Invention

The present invention relates to a document reading apparatus, and more particularly, to a document reading apparatus that reads a document image with a CCD image sensor.

2. Description of the Related Art

Conventionally, there have been document reading apparatuses each using a CCD image sensor that has output terminals, including a combination of First and Last terminals, a combination of the First and Last terminals and odd-number (Odd) and even-number (Even) terminals. In each of the conventional document reading apparatuses, those output terminals are provided for each line.

Japanese Laid-Open Patent Application No. 6-14188, filed by the present applicant, discloses such a document reading apparatus in which gamma correction is performed separately on the odd-number (O) data and the even-number (E) data of image data that are read by an image sensor. After A/D conversion and shading correction, the O/E levels are adjusted by gamma correction.

In this manner, the differences between the odd-number (O) outputs and the even-number (E) outputs from output terminals are adjusted after the A/D conversion. Gamma tables are provided separately for the O outputs and the E outputs, and the OE outputs are adjusted at each level.

However, only integer correction can be performed by the method of performing gamma correction on digital data as disclosed in the above mentioned patent publication. Furthermore, the gradient in a region with a great non-linear inclination might be degraded by such a method.

This conventional correction method is effective for the O/E correction, but it is not effective enough with one of the latest CCDs that includes a terminal (First terminal) that sequentially outputs the first half of the pixels of an image, starting from the first pixel, and a terminal (Last terminal) that sequentially outputs the last half of the pixels, starting from the last pixel. With such a CCD, there is a boundary at the center between the First region and the Last region in each image, and an output difference (F/L difference) as small as 1 LSB stands out on the boundary.

SUMMARY OF THE INVENTION

A general object of the present invention is to provide a document reading apparatus in which the above disadvantages are eliminated.

A more specific object of the present invention is to provide a document reading apparatus that can correct the decimal portion, if any, as well as the integer portion of each average value difference among terminals, so as to prevent an unnecessary boundary from appearing in the center of an output image, even though pixel outputs of a photoelectric converter array are allocated to the terminals.

The above objects of the present invention are achieved by a document reading apparatus that includes: a light source that irradiates the surface of a document with light; an optical system that leads the light reflected by the document to a predetermined position; a photoelectric converter array that photoelectrically converts the light led by the optical system; an A/D converter unit that analog-to-digital converts each pixel output from the photoelectric converter array. In this document reading apparatus, the pixel outputs of the photoelectric converter array are suitably allocated to different terminals of the photoelectric converter array and are then output from the photoelectric converter array. This document reading apparatus further includes: an average output value detecting unit that detects the average value of the digital output of each of the terminals digitized by the A/D converter unit; and a terminal difference correcting unit that corrects the detected difference in average values between the terminals. Here, if the difference in average values between the terminals includes a decimal, the terminal difference correcting unit also corrects the decimal.

The average output value detecting unit is preferably designed to detect the difference between the average output value of a reference terminal and the average output value of each of the other terminals with respect to each of quantities of incident light that range from a small quantity to a large quantity. The terminal difference correcting unit preferably has a function of correcting the level difference with respect to each incident light quantity. Here, if the level difference includes a decimal, the terminal difference correcting unit also corrects the decimal.

Further, the average output value detecting unit is preferably designed to detect the difference between the average output value of a reference terminal and the average output value of each of the other terminals when the quantity of incident light is approximately at the middle level. The terminal difference correcting unit preferably has a function of calculating the output difference with respect to each of quantities of incident light that vary from a small quantity to a large quantity, based on the average output value difference detected when the quantity of incident light is at the middle level, and also has a function of correcting the level difference with respect to each incident light quantity. Here, if the level difference includes a decimal, the terminal difference correcting unit also corrects the decimal.

In the above document reading apparatus, part of or all of the terminals, to which the pixel outputs of the photoelectric converter array are allocated, preferably include a terminal that sequentially outputs the first half of the pixels, starting from the first pixel, and a terminal that sequentially outputs the last half of the pixels, starting from the last pixel.

With this document reading apparatus in accordance with the present invention, the decimal portion as well as the integer portion of each average value difference among the terminals can be corrected, so as to prevent an unnecessary boundary from appearing in the center of an output image, even though the pixel outputs of the photoelectric converter array are allocated to the terminals.

The above and other objects, features, and advantages of the present invention will become more apparent from the following detailed description taken in conjunction with the accompanying drawings.

BRIEF DESCRIPTION OF THE DRAWINGS

FIG. 6 is an example of a table that shows estimated F/L differences with respect to document image data.

DESCRIPTION OF THE PREFERRED EMBODIMENTS

The following is a description of embodiments of the present invention, with reference to the accompanying drawings.

Figure 1:
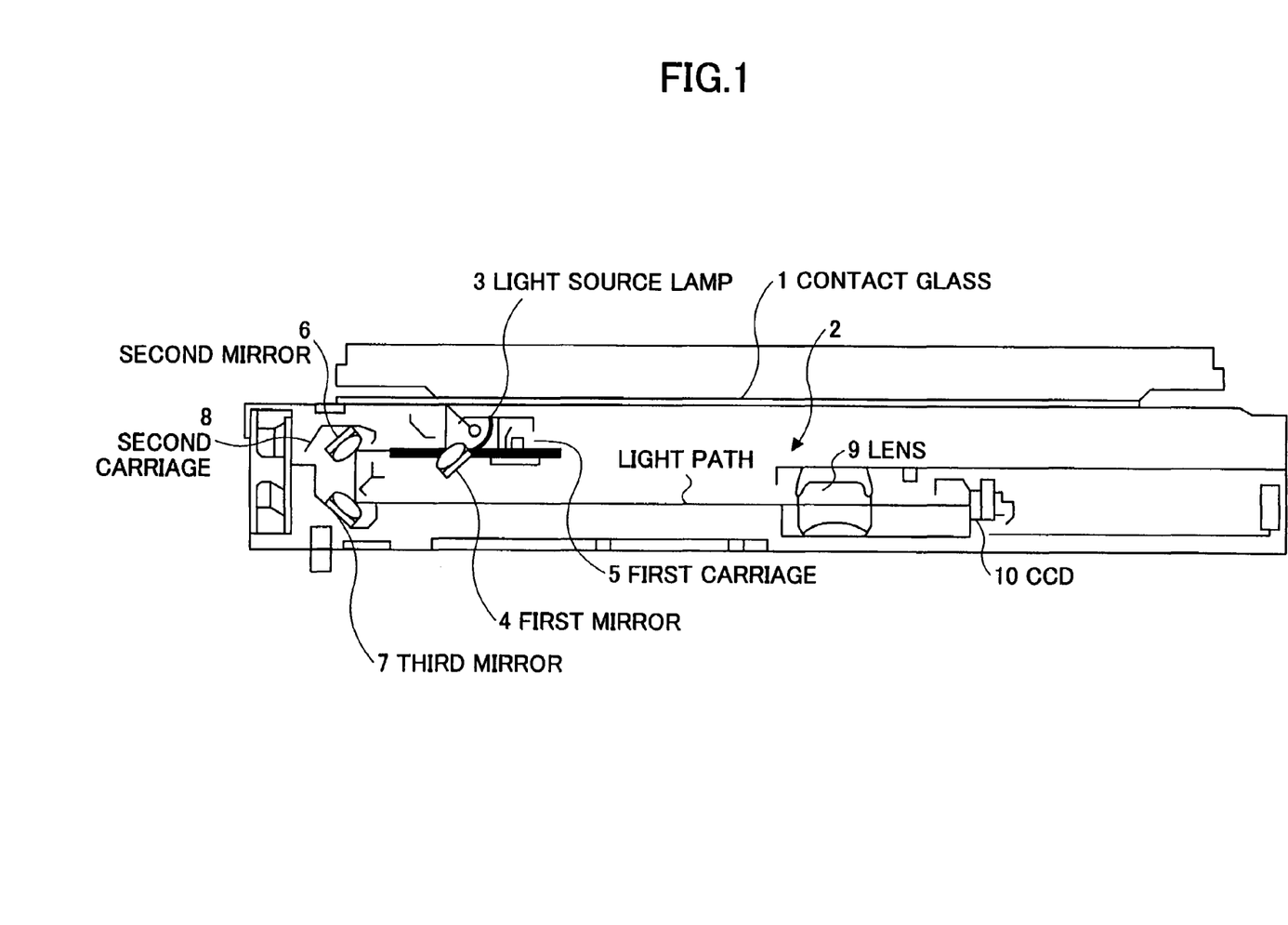
FIG. 1 illustrates the structure of a document reading apparatus as an embodiment of the present invention.

FIG. 1 illustrates the structure of a document reading apparatus as an embodiment of the present invention. The main body 2 of this document reading apparatus includes an optical system and a CCD 10. The optical system includes a first carriage 5 that carries a light source lamp 3 and a first mirror 4, a second carriage 8 that carries a second mirror 6 and a third mirror 7, and a lens 9. The CCD 10 photoelectrically converts each optically picked-up image. With this structure, the main body 2 of the document reading apparatus can read each document placed on a contact glass 1.

The first carriage 5 and the second carriage 8 are moved to the right in FIG. 1 by a motor (not shown), so as to read the entire image of each document.

Figure 2:
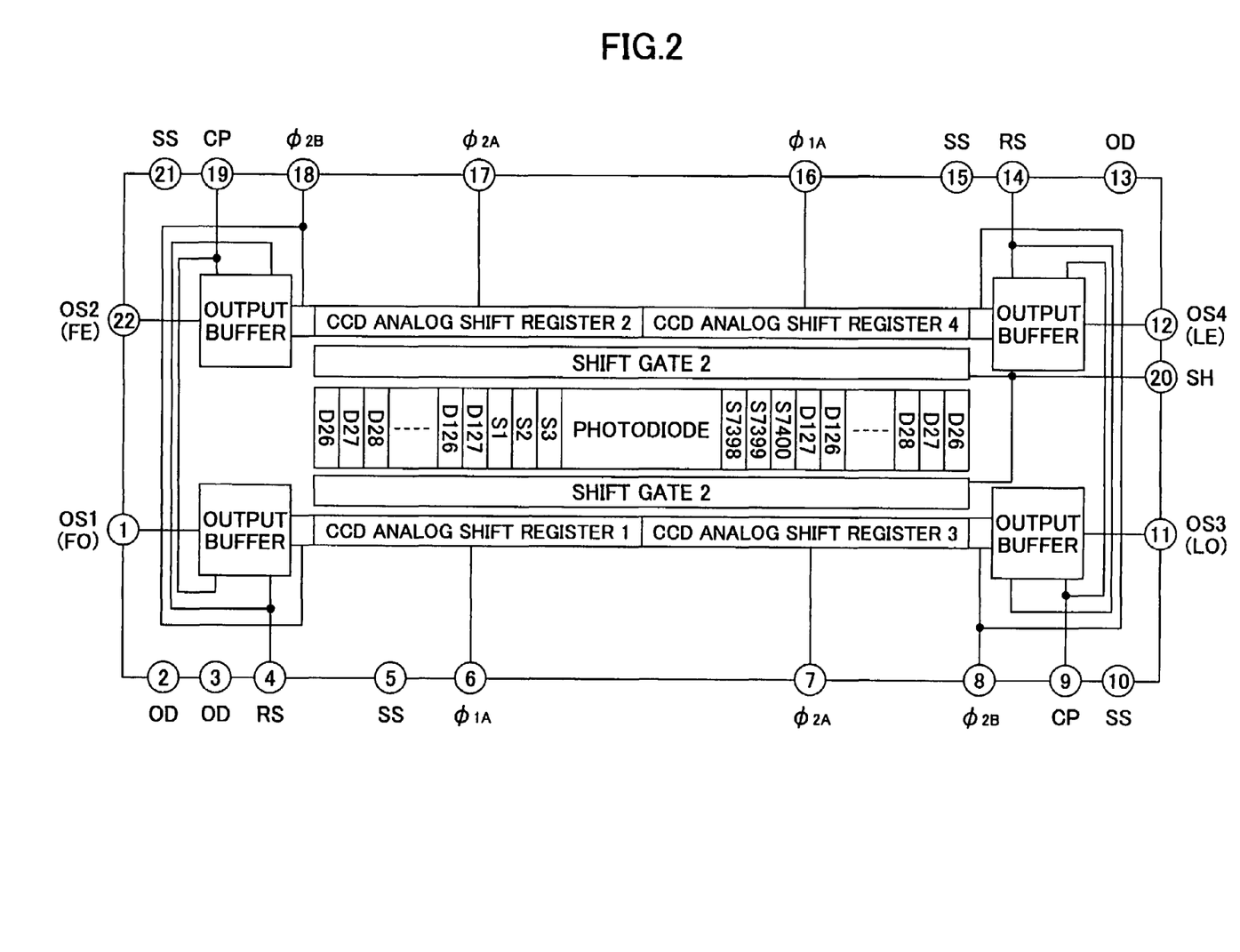
FIG. 2 illustrates the inner structure of a F/L CCD that is employed in the document reading apparatus of FIG. 1.

FIG. 2 illustrates the inner structure of the CCD 10 that is a F/L CCD employed in the document reading apparatus.

So as to increase the frequency for CCD transfer, an odd-number (O) terminal and an even-number (E) terminal are provided to each of the terminals (the First terminal, hereinafter referred to as the F terminal) for transferring and outputting the first half pixels, starting from the first pixel, and the terminals (the Last terminal, hereinafter referred to as the L terminal) for transferring and outputting the last half of the pixels, starting from the last pixel. Accordingly, there are four outputs (OS1 through OS4) in total.

Figure 3:
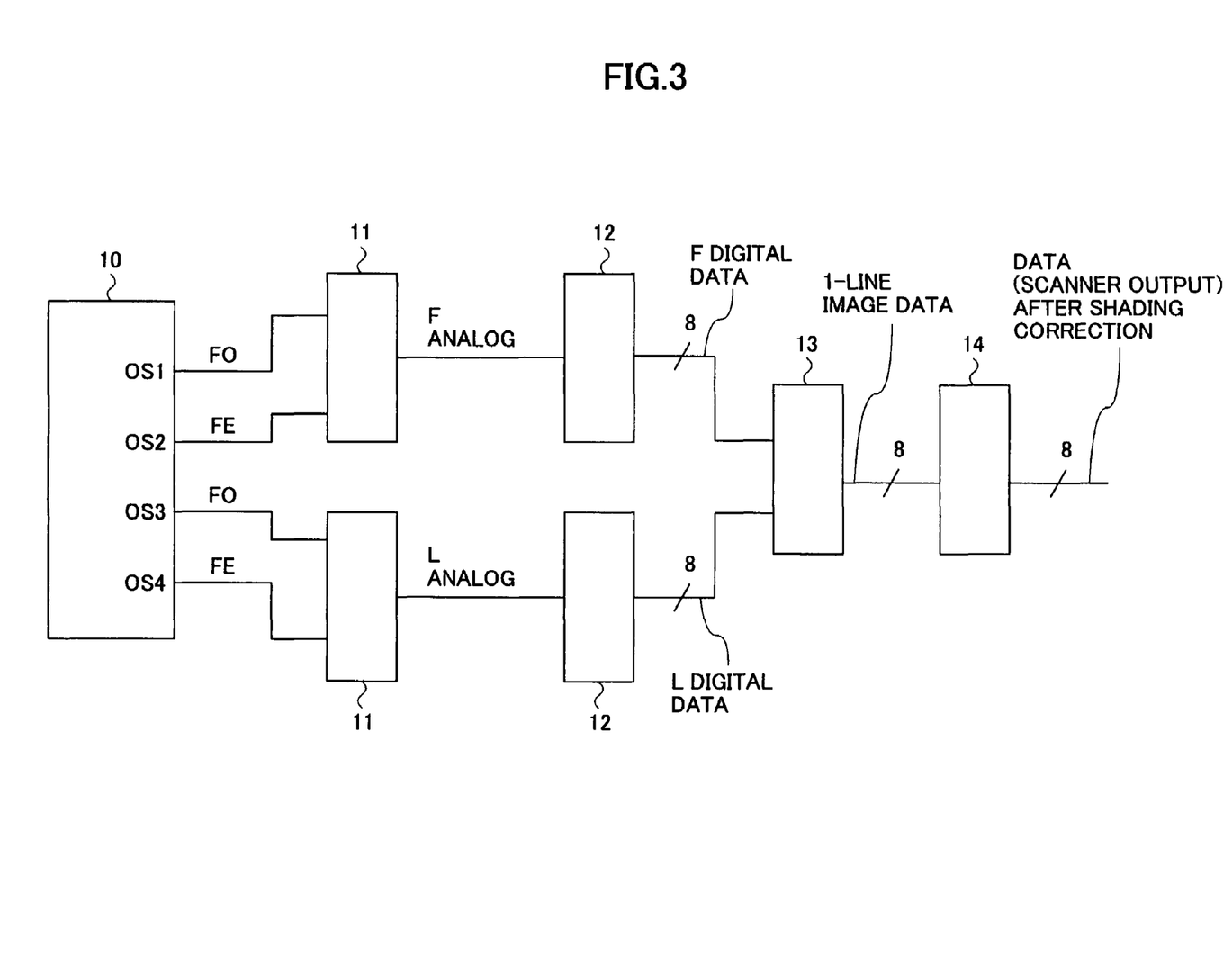
FIG. 3 is a block circuit diagram of a document reading apparatus that employs a conventional F/L CCD.

FIG. 3 is a block circuit diagram of a document reading apparatus that employs a conventional F/L CCD. An image signal read by the CCD 10 is output from the FO, FE, LO, and LE terminals.

In the analog signal processing circuit, the outputs from the FO and FE terminals are received by an analog processing LSI 11, and the outputs from the LO and LE terminals are received by another analog processing LSI 11. With this structure, the analog signal processing circuit generates a proper analog signal by performing gain adjustment and combining the O and E outputs.

Receiving the generated analog signal, each of analog-to-digital (A/D) converters 12 converts the image signal into a digital signal. Upon receipt of the converted 8-bit digital data, a FL rearranging LSI 13 rearranges the order of F and L to generate 1-line image data. A shading correcting circuit 14 that includes a memory and an arithmetic unit corrects the illumination distribution and the difference in sensitivity among the pixels, so that corrected data are output from the document reading apparatus.

Figure 4:
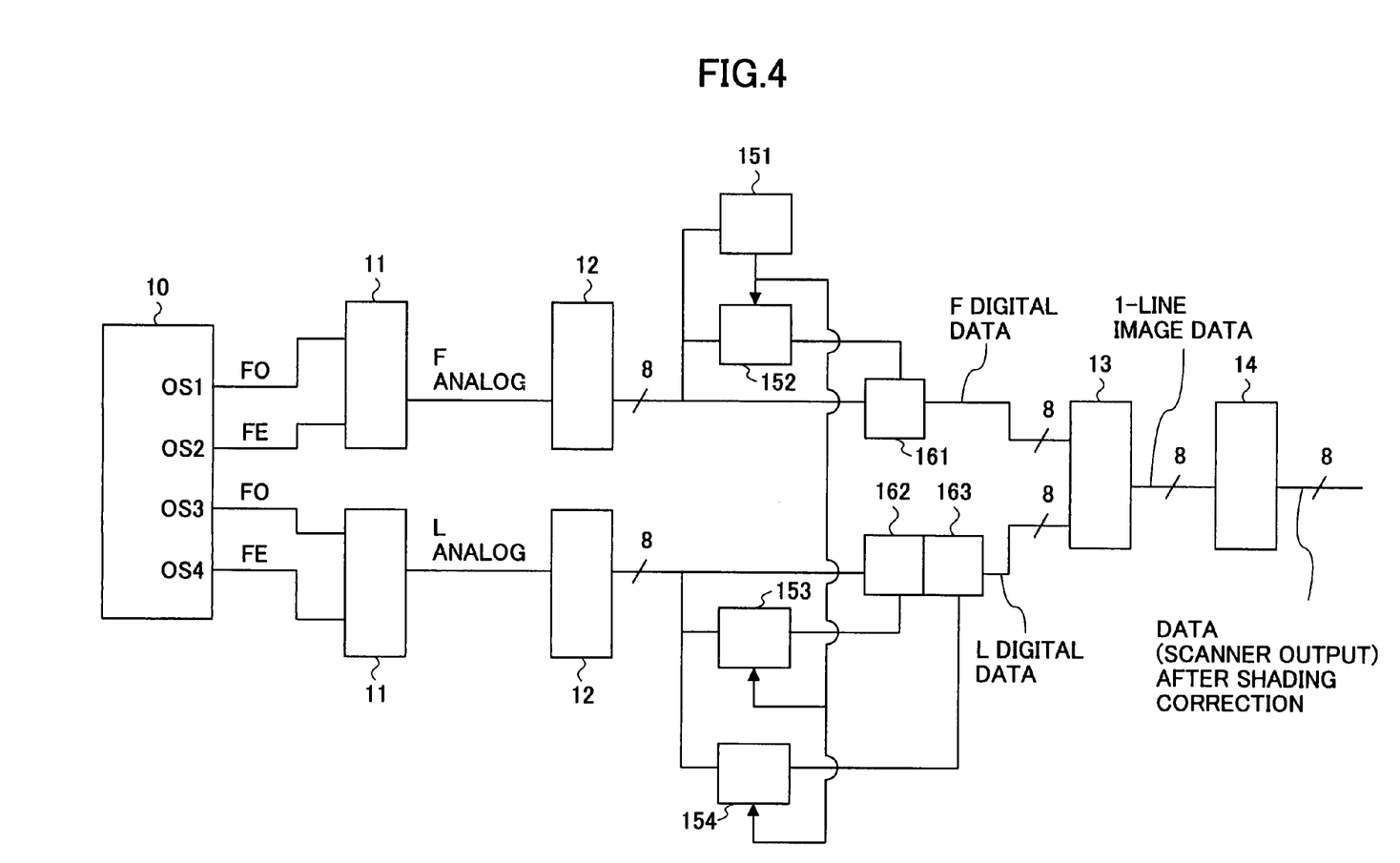
FIG. 4 is a block circuit diagram of a document reading apparatus in accordance with the present invention.

FIG. 4 illustrates a circuit structure of the present invention, as opposed to the conventional circuit structure shown in FIG. 3. The circuit structure of the present invention includes average output value detecting circuits and random value generating adder/subtractor circuits, as well as the components of the conventional circuit structure shown in FIG. 3.

In the following, the operation in a case where the outputs of the three terminals other than the FO terminal are corrected, with the output of the FO terminal being the reference output, is described. It should be understood that the same operation is performed in a case where an output other than the output from the FO terminal is used as the reference output. Also, the O and E outputs may not be detected, and a correcting operation may be performed on the F and L outputs.

Average output value detecting circuits 15 (151, 152, 153, and 154) detect and hold the average output values of the pixels of the FO, FE, LO, and LE outputs, respectively. Being digital data, the output value of each pixel is an integer. However, the average value of two or more pixels might of course include a decimal.

Random value generating adder/subtractor circuits 16 (161, 162, and 163) in the next stage perform addition or subtraction on the outputs of the three terminals other than the FO terminal, so that the average value of each of the other three terminals becomes substantially equal to the average value of the FO outputs. Receiving the results of comparison between the average output value of pixels of each of the FE, LO, and LE outputs and the average output value of the FO outputs, the random value generating adder/subtractor circuits 16 (161, 162, and 163) perform addition and subtraction on the output values of the three terminals.

Here, the "random value generating" function of the random value generating adder/subtractor circuits 16 is essential. If the LO output as digital data is smaller than the FO output by 1.5, 1.5 should be added to all the data of the LO outputs. However, since the data are made up of integers, the value of 1.5 cannot be selected. To counter this problem, each of the random value generating adder/subtractor circuits 16 has a function of randomly generating any value between 0 and 1, and performs an arithmetic operation on all the pixels of the LO outputs, using the following equation:

$$Dout = ROUND(Din - 0.5 + RAND + a)$$

where: ROUND represents a round-off function for rounding off a decimal point or below; RAND represents a random number that is renewed for each pixel; and "a" represents the difference in average value, which is 1.5 in the above described case.

Accordingly, 50% of Dout are pixel data obtained by adding 1 with respect to Din, and the other 50% of Dout are pixel data obtained by adding 2 with respect to Din. The value added to the data of each individual pixel is 1 or 2, but the entire image appears in accordance with the quantum theory.

As a result, the resultant image is equivalent to an image obtained by adding 1.5.

In this manner, each of the random value generating adder/subtractor circuits 16 functions as terminal difference correcting means for correcting the difference in average value between the terminals detected by the corresponding average output value detecting circuit 15. Here, if the average value difference includes a decimal, the terminal difference correcting means also corrects the decimal.

Likewise, if the average output value of the LO terminal is smaller by 1.35, "a" should be 1.35 in the above equation. By doing so, 65% of the pixel data are obtained by adding 1, and 35% of the pixels are obtained by adding 2, so that the resultant image is equivalent to an image obtained by adding 1.35.

Next, another application example of the present invention is described.

Several types of gray charts, including a white chart with a high reflectance and a black chart with a low reflectance, are read in advance, and the average value of each of the FO, FE, LO, LE outputs are obtained and kept. Correction may be performed in the same manner as described above using the above equation, but the value of "a" varies depending on the density of each chart. The middle level (the level of the quantity of incident light with respect to the element of the CCD) between the charts is complemented, and a F/L difference correction table (described later) is produced.

Yet another application example of the present invention is described.

Having a high halftone level, a F/L difference (same as an O/E difference) tends to be small, whether the reflectance is high or low.

Figure 5:
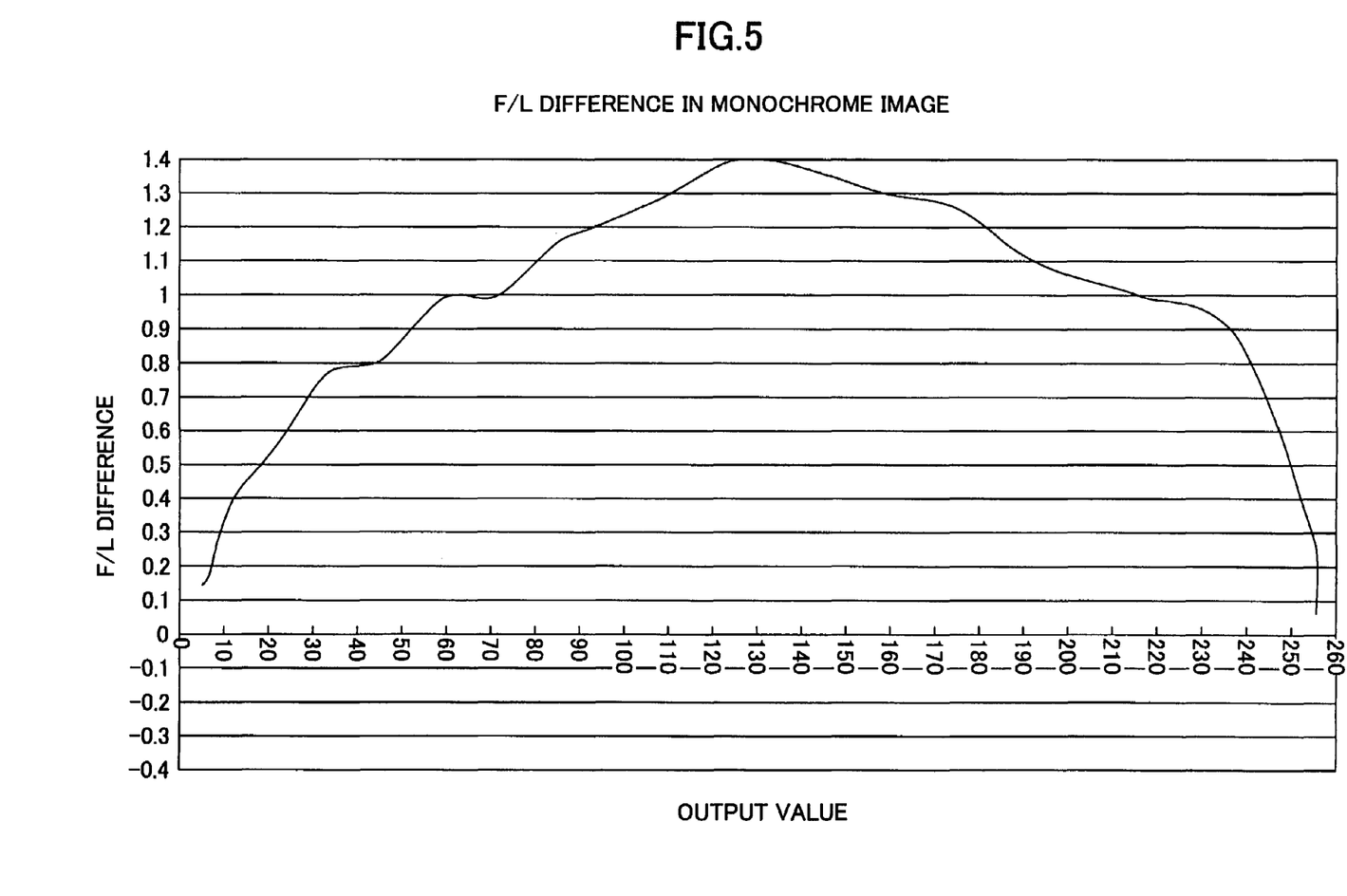
FIG. 5 is a graph representative of an example of the F/L difference with respect to output values.

FIG. 5 is a graph showing an example of the F/L difference with respect to output values. As can be seen from this graph, the F/L difference becomes greatest at the halftone level. The maximum value varies depending on the terminal or the machine type. The F/L differences of the all levels can be estimated by obtaining the difference between terminals at the halftone level at which the F/L difference becomes greatest.

FIG. 6 shows a table that contains estimated F/L differences at all levels from 0 to 255 where the maximum value of the F/L difference at the middle level 128/255 (a half of the 8-bit full scale 255) is 1.4.

According to this table, real-time processing can be performed on the image data of 0 through 255, referring to the value of "a" (in the above equation) corresponding to the image data.

As described above, the document reading apparatus of this embodiment includes: a light source that irradiates the surface of a document with light; an optical system that leads the light reflected by the document to a predetermined position; a photoelectric converter array that is placed in the predetermined position; and an A/D converter unit that analog-to-digital converts each pixel output. In this document reading apparatus, the pixel outputs of the photoelectric converter array are suitably allocated to different output terminals of the photoelectric converter array and are then output from the photoelectric converter array. This document reading apparatus further includes: a structure that detects the average value of the digital output of each of the output terminals; and a correcting function of correcting the difference in average value between the output terminals. Here, if the difference in average value between the output terminals includes a decimal, the correcting function also corrects the decimal.

With this structure, the average values of digital outputs of the terminals are detected, and the integer portion of the difference among the average values is corrected, as well as the decimal portion of the difference, if the average value difference among the terminals includes a decimal. By doing so, the level difference among the terminals can be minimized, and improved image quality can be achieved, without an unnecessary boundary appearing in the center of the output image.

Also, the document reading apparatus includes: a structure that detects the difference between the average output value of a reference terminal and the average output value of each of the other terminals with respect to each of quantities of incident light that range from a small quantity to a large quantity; and a function of correcting the level difference with respect to each incident light quantity. Here, if the level difference includes a decimal, the terminal difference correcting unit also corrects the decimal.

With this structure, the difference between the average output value of the reference terminal and the average output value of each of the other terminals with respect to each of quantities of incident light that range from a small quantity to a large quantity can be detected, and the level difference with respect to each incident light quantity can be corrected even if the level difference includes a decimal. Thus, an unnecessary boundary can be prevented from appearing in the center of an output image, and further improved image quality can be achieved.

Also, the document reading apparatus includes: a structure that detects the difference between the average output value of a reference terminal and the average output value of each of the other terminals when the quantity of incident light is approximately at the middle level; a function of calculating the output difference with respect to each of quantities of incident light that vary from a small quantity to a large quantity, based on the average output value difference detected when the quantity of incident light is at the middle level; and a function of correcting the level difference with respect to each incident light quantity. Here, if the level difference includes a decimal, the difference correcting function also corrects the decimal.

With this structure, the difference between the average output value of the reference terminal and the average output value of each of the other terminals is detected when the quantity of incident light is approximately at the middle level, and the output difference with respect to each of quantities of incident light that vary from a small quantity to a large quantity is detected, based on the average output value difference detected when the quantity of incident light is at the middle level. If the level difference includes a decimal, the decimal also can be corrected. Thus, an unnecessary boundary can be prevented from appearing in the center of an output image, and further improved image quality can be achieved.

In the above document reading apparatus, part of or all of the terminals, to which pixel outputs of the photoelectric converter array are allocated, include a terminal that sequentially outputs the first half of the pixels, starting from the first pixel, and a terminal that sequentially outputs the last half of the pixels, starting from the last pixel.

Accordingly, correction can be performed on the F/L output value difference in a CCD that includes a terminal that sequentially outputs the first half of pixels, starting from the first pixel, and a terminal that sequentially outputs the last half of the pixels, starting from the last pixel. Particularly, the image quality of a F/L CCD can be improved.

The function of the random value generating adder/subtractor circuit 16 that arbitrarily generates a value between 0 and 1 may be embodied by a CPU or other hardware.

It should be noted that the present invention is not limited to the embodiments specifically disclosed above, but other variations and modifications may be made without departing from the scope of the present invention.

This patent application is based on Japanese Priority Patent Application No. 2003-326920, filed on Sep. 18, 2003, the entire contents of which are hereby incorporated by reference.

What is claimed is:

1. A document reading apparatus, comprising:
   a light source configured to irradiate the surface of a document with light;
   an optical system configured to lead the light reflected by the document to a predetermined position;
   a photoelectric converter array configured to photoelectrically convert the light led by the optical system, pixel outputs of the photoelectric converter array being allocated to a plurality of terminals and then being output;
   an A/D converter unit configured to analog-to-digital convert each pixel output from the photoelectric converter array to produce digital outputs that are integers;
   an average output value detecting unit configured to detect the average value of the integer digital outputs of each terminal converted by the A/D converter unit; and a terminal difference correcting unit configured to correct the integer digital outputs of a first one of the terminals in response to a difference between the average value of the first one of the terminals and the average value of a second one of the terminals, a decimal being distributed to the integer digital outputs of the first one of the terminals when the difference in average values includes the decimal, wherein the terminal difference correcting unit includes at least one random value generating adder/subtractor unit configured to perform an arithmetic operation on an integer digital output of the integer digital outputs, using the equation:

$$D_{out}=\text{ROUND}(D_{in}-0.5+\text{RAND}+a), \text{ wherein}$$

"ROUND" is a round-off function for rounding off a decimal, "$D_{in}$" is the integer digital output, "RAND" is a random value between 0 and 1, "a" is the difference in average values, and "$D_{out}$" is the corrected integer digital output.

2. The document reading apparatus as claimed in claim 1, wherein the average output value detecting unit is designed to detect the difference with respect to each of quantities of incident light that range from a small quantity to a large quantity, and the terminal difference correcting unit has a function of correcting the integer digital outputs of the first one of the terminals separately for each incident light quantity.

3. The document reading apparatus as claimed in claim 1, wherein the average output value detecting unit is designed to detect the difference when the quantity of incident light is at a middle level in a range from a small quantity to a large quantity, and the terminal difference correcting unit has a function of calculating the difference with respect to each of quantities of incident light that vary from the small quantity to the large quantity, based on the difference detected when the quantity of incident light is at the middle level, and also has a function of correcting the integer digital outputs of the first one of the terminals separately for each incident light quantity.

4. The document reading apparatus as claimed in claim 1, wherein part of or all of the plurality of terminals, to which pixel outputs of the photoelectric converter array are allocated, include a terminal configured to sequentially output the first half of the pixels, starting from the first pixel, and a terminal configured to sequentially output the last half of the pixels, starting from the last pixel.

5. An image forming apparatus, comprising:

a light source configured to irradiate the surface of a document with light;

an optical system configured to lead the light reflected by the document to a predetermined position;

a photoelectric converter array configured to photoelectrically convert the light led by the optical system, pixel outputs of the photoelectric converter array being allocated to a plurality of terminals and then being output;

an A/D converter unit configured to analog-to-digital convert each pixel output from the photoelectric converter array to produce digital outputs that are integers;

an average output value detecting unit configured to detect the average value of the integer digital outputs of each terminal converted by the A/D converter unit; and a terminal difference correcting unit configured to correct the integer digital outputs of a first one of the terminals in response to a difference between the average value of the first one of the terminals and the average value of a second one of the terminals, a decimal being distributed to the integer digital outputs of the first one of the terminals when the difference includes the decimal, wherein the terminal difference correcting unit includes at least one random value generating adder/subtractor unit configured to perform an arithmetic operation on an integer digital output of the integer digital outputs, using the equation:

$$D_{out}=\text{ROUND}(D_{in}-0.5+\text{RAND}+a), \text{ wherein}$$

"ROUND" is a round-off function for rounding off a decimal, "$D_{in}$" is the integer digital output, "RAND" is a random value between 0 and 1, "a" is the difference in average values, and "$D_{out}$" is the corrected integer digital output.

6. A method of reading a document, comprising:

irradiating the surface of a document with light;

leading the light reflected by the document to a predetermined position;

photoelectrically converting the light, and allocating pixel outputs of the converted light to a plurality of terminals;

analog-to-digital converting each of the pixel outputs to produce digital outputs that are integers;

detecting the average value of the integer digital outputs of each of the terminals;

correcting the integer digital outputs of a first one of the terminals in response to a difference between the average value of the first one of the terminals and the average value of a second one of the terminals, a decimal being distributed to the integer digital outputs of the first one of the terminals when the difference includes the decimal; and performing an arithmetic operation on an integer digital output of the integer digital outputs, using the equation:

$$D_{out}=\text{ROUND}(D_{in}-0.5+\text{RAND}+a), \text{ wherein}$$

"ROUND" is a round-off function for rounding off a decimal, "$D_{in}$" is the integer digital output, "RAND" is a random value between 0 and 1, "a" is the difference in average values, and "$D_{out}$" is the corrected integer digital output.

* * * * *